(12) United States Patent
Medicke et al.

(10) Patent No.: US 7,487,173 B2
(45) Date of Patent: Feb. 3, 2009

(54) SELF-GENERATION OF A DATA WAREHOUSE FROM AN ENTERPRISE DATA MODEL OF AN EAI/BPI INFRASTRUCTURE

(75) Inventors: John A. Medicke, Raleigh, NC (US); Feng-Wei Chen Russell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 10/443,703

(22) Filed: May 22, 2003

(65) Prior Publication Data

US 2004/0236786 A1 Nov. 25, 2004

(51) Int. Cl.
*G06F 17/30* (2006.01)
(52) U.S. Cl. .................. 707/102; 707/100; 707/101; 707/103 R; 707/103 Y
(58) Field of Classification Search .......... 707/100, 707/101, 102, 103 R, 103 Y
See application file for complete search history.

(56) References Cited

U.S. PATENT DOCUMENTS

| | | | | |
|---|---|---|---|---|
| 5,675,785 | A | 10/1997 | Hall et al. | 395/613 |
| 6,138,121 | A | 10/2000 | Costa et al. | 707/100 |
| 6,212,524 | B1* | 4/2001 | Weissman et al. | 707/101 |
| 6,411,961 | B1 | 6/2002 | Chen | 707/102 |
| 6,418,450 | B2 | 7/2002 | Daudenarde | 707/200 |
| 6,442,269 | B1 | 8/2002 | Ehrlich et al. | 379/265.03 |
| 6,609,123 | B1* | 8/2003 | Cazemier et al. | 707/4 |
| 6,668,253 | B1* | 12/2003 | Thompson et al. | 707/10 |
| 2002/0161778 | A1 | 10/2002 | Linstedt | 707/102 |
| 2003/0093429 | A1* | 5/2003 | Nishikawa et al. | 707/10 |
| 2004/0153435 | A1* | 8/2004 | Gudbjartsson et al. | 707/1 |
| 2004/0199517 | A1* | 10/2004 | Casati et al. | 707/100 |

FOREIGN PATENT DOCUMENTS

| | | |
|---|---|---|
| CA | 2331965 A1 | 7/2002 |
| JP | 2001265783 A | 9/2001 |
| WO | WO0042553 A2 | 7/2000 |

OTHER PUBLICATIONS

Lin et al. "A Database Application Generator for the WWW," Journal of the Chinese Institute of Engineers. 1998, vol. 21, No. 3, pp. 337-346.
Taylor, Art, "Java-Charging the Data Warehouse," *Database Programming & Design*. 1997, vol. 10, No. 10, p. 58.
Zheng Bin xiang et al. Abstract of "Design of object-oriented data warehouse using snow-star schema: its application in the power system of Bao Steel Group," *Journal of Applied Sciences*. Jun. 2002, vol. 20, No. 2, pp. 165-168.

(Continued)

*Primary Examiner*—Hung Q Pham
(74) *Attorney, Agent, or Firm*—Stevens & Showalter LLP

(57) ABSTRACT

A data warehouse is generated by incorporating data warehouse information in business objects to provide subscribed business objects and generating star-schema tables of the data warehouse from the subscribed business objects. Data from subscribed business objects may be logged when an event of the subscribed business objects is processed, for example, by an integration node, and the logged data incorporated into the star-schema tables of the data warehouse.

20 Claims, 10 Drawing Sheets

OTHER PUBLICATIONS

Convis et al. "Development Metrics," *Research Disclosure*, Jul. 1989.

Gopalkrishnan, "Star/Snow-Flake Schema Driven Object-Relational Data Warehouse Design and Query Processing Strategies," *Data Warehousing and Knowledge Discovery*. Proc. First International Conf. Florence, Italy, Aug. 30-Sep. 1, 1999.

Ravat et al. "A Temporal Object-Oriented Data Warehouse Model," *Database and Expert Systems Applications*. Proc. 11 th International Conf., London, UK, Sep. 4-8, 2000.

You et al. "On Agent based visual Data Mining for Intelligent Web Browsing with E-Commerce Applications," *IEEE International Fuzzy Systems Conference*, 2001.

* cited by examiner

SELF-GENERATION OF A DATA WAREHOUSE FROM AN ENTERPRISE DATA MODEL OF AN EAI/BPI INFRASTRUCTURE

FIELD OF THE INVENTION

The present invention relates to data warehouses and more particularly to the creation and/or maintenance of data warehouses.

BACKGROUND OF THE INVENTION

With increases in the use of computers to collect and store data and with increases in computer based transactions, such as over the Internet, there has been a proliferation of databases containing large amounts of historical data commonly referred to as "data warehouses." For example, as more and more data is collected regarding consumer purchase and/or shopping habits, this data may be stored in a data warehouse for subsequent analysis. Other uses of data warehouses include, for example, data warehouses of genetic or other scientific data.

While the particular data may vary for different data warehouses, in general, data warehouses are databases of historical data that may utilize a "star-schema" database structure. A data warehouse is typically present to users through a multi-dimensional hypercube and provides an ad hoc query environment. Furthermore, the data warehouse will, typically, contain a large amount of data and have a complex structure.

The multi-dimensional hypercube, typically includes several "dimensions" where each dimension includes "members." The members of a dimension may have a hierarchical structure. A "measure" of a dimension or dimensions may be incorporated into a data warehouse as a pre-calculated value. Thus, a measure is a computer member. For example, a measure may be incorporated into a meta-outline of a data warehouse. In such a way, the pre-calculated "measure" may be made available to users of the data warehouse. Pre-calculated measures of dimensions of a data warehouse are sometimes referred to as "analytics" of a data warehouse.

Because of the size and complexity of data warehouses, they are typically created, administered and maintained by an information technology specialist. As such, creation, modification and/or analysis of data warehouses may be a costly and time consuming proposition.

For example, in creating a data warehouse, an enterprise data architecture is typically analyzed and represented in the data warehouse. After this analysis, the data is extracted, transformed and loaded into the data warehouse from other, dissimilar databases. This analysis and creation of the data warehouse architecture and the extraction, transformation and loading of data may be very costly and time consuming. As such, the usefulness and/or timeliness of data warehouse applications may be reduced.

Furthermore, the data warehouse star-schema database and integration hub used for integrating data in the data warehouse are, conventionally, separate isolated applications even though the data warehouse contains the superset of data which includes the transaction information in the hub. The information in the integration hub is not transparent to the warehouse. The integration hub transforms the data once for integration purposes and is, typically, managed and/or created by information technology experts that understand the data format, type and meaning and are relied on to transform, extract, and load the data again.

Recently, Enterprise Application Integration (EAI) and/or Business Process Integration (BPI) have been utilized to integrate multiple applications through enterprise application techniques, such as integration brokers and/or integration buses. Furthermore, these tools have been extended to manage business processes through business process integration techniques. These application and/or business process integration techniques, collectively and individually, are referred to herein as an integration node. The integration node provides business objects that characterize business information and/or transactions. These business objects, therefore, reflect the business processes of a business and/or the data about such business processes.

SUMMARY OF THE INVENTION

Embodiments of the present invention provide methods, systems, and computer program products for generating a data warehouse by incorporating data warehouse information in business objects to provide subscribed business objects and generating star-schema tables of the data warehouse from the subscribed business objects. Data from subscribed business objects may be logged when an event of a subscribed business object is processed and the logged data incorporated into the star-schema tables of the data warehouse.

In further embodiments of the present invention, data warehouse information incorporated with generated business objects includes log formation, primary key information, foreign key information, fact table foreign key information, and/or fact table measure information.

In additional embodiments of the present invention, generating star-schema tables includes generating a dimension table from data warehouse information of a subscribed business object and generating a fact table from data warehouse information of a subscribed business object. Additionally, subscribed business objects may be categorized as transactional business objects or informational business objects. In such a case, a dimension table may be generated from data warehouse information of a subscribed business object categorized as an informational business object and a fact table may be generated from data warehouse information of a subscribed business object categorized as a transaction business object.

In still other embodiments of the present invention, generating a dimension table includes generating a data definition language (DDL) description of the dimension table from the data warehouse information of a subscribed business object. Then, a DDL description of the fact table is generated from the data warehouse information of a subscribed business object. Then, the DDL descriptions are executed to generate the dimension table and the fact table.

In particular embodiments of the present invention, generating star-schema tables also includes generating a predefined dimension table. In such embodiments, a dimension branch table associated with the predefined dimension table may also be populated.

In additional embodiments of the present invention, logging data from subscribed business objects is provided by determining if an integration node event associated with a subscribed business object has occurred and extracting data from the subscribed business object if the integration node event associated with the subscribed business object has occurred. The extracted data may be stored in a staging database and/or a flat file. Mapping rules may be defined that map data from business objects to star-schema tables of the data warehouse. The logged data may be incorporated into the star-schema tables of the data warehouse by transforming the data in the staging database and/or a flat file based on the mapping rules and loading the transformed data into the star-schema tables of the data warehouse.

In still further embodiments of the present invention, a system for generating a data warehouse includes a business object designer configured to incorporate data warehouse information in business objects so as to provide subscribed business objects. A star-schema manager is configured to generate star-schema tables of the data warehouse based on the incorporated data warehouse information of the subscribed business objects. An audit log engine is configured to extract information from subscribed business objects and store the extracted information in an audit log. A transformer/loader is configured to load the information stored in the audit log into the data warehouse by populating the star-schema tables of the data warehouse with the information stored in the audit log.

In yet additional embodiments of the present invention, the data warehouse information included in the business objects by the business object designer includes log formation, primary key information, foreign key information, fact table foreign key information, and/or fact table measure information.

Furthermore, the star-schema manager may be further configured to generate a dimension table from data warehouse information of a subscribed business object and generate a fact table from data warehouse information of a subscribed business object. Subscribed business objects may be categorized as either transactional business objects or informational business objects and the star-schema manager may be configured generate a dimension table from data warehouse information of a subscribed business object categorized as an informational business object and generate a fact table from data warehouse information of a subscribed business object categorized as a transaction business object.

The star-schema manager may also be configured to generate a data definition language (DDL) description of the dimension table from the data warehouse information of a subscribed business object, then generate a DDL description of the fact table from the data warehouse information of a subscribed business object and then execute the DDL descriptions to generate the dimension table and the fact table. The star-schema manager may also generate a predefined dimension table. In such a case, the star-schema manager may be further configured to populate a dimension branch table associated with the predefined dimension table.

The audit log engine may be configured to determine if an integration node event associated with a subscribed business object has occurred and extract data from the subscribed business object if the integration node event associated with the subscribed business object has occurred. The audit log engine may also be configured to store the extracted data in a staging database and/or a flat file.

Mapping rules that map data from business objects to star-schema tables of the data warehouse may be defined and the transformer/loader may be configured to transform the data in the staging database and/or a flat file based on the mapping rules and load the transformed data into the star-schema tables of the data warehouse.

As will further be appreciated by those of skill in the art, while described above primarily with reference to method aspects, the present invention may be embodied as methods, apparatus/systems and/or computer program products.

DETAILED DESCRIPTION OF THE INVENTION

Figure 1:
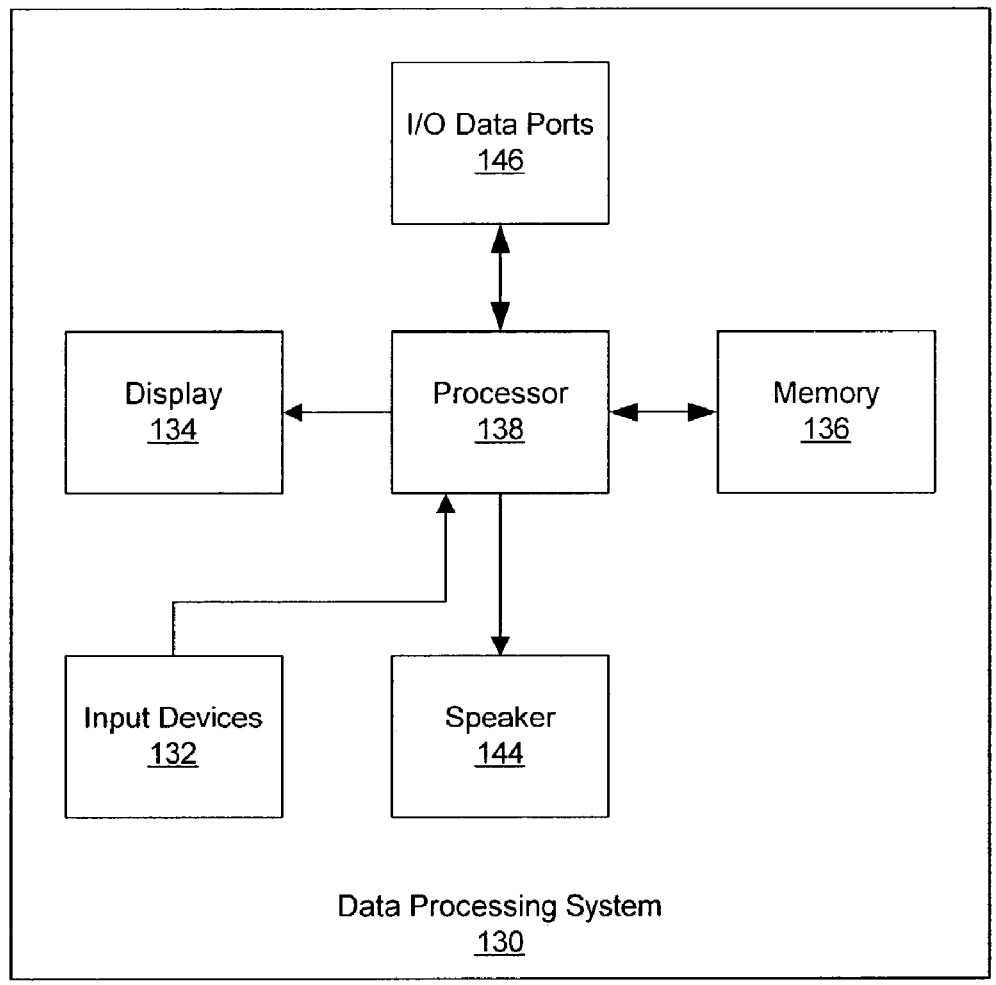
FIG. 1 is a block diagram of a data processing system suitable for use in embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Various embodiments of the present invention will now be described with reference to the figures. FIG. 1 illustrates an exemplary embodiment of a data processing system 130 suitable for use in accordance with embodiments of the present invention. The data processing system 130 typically includes input device(s) 132 such as a keyboard or keypad, a display 134, and a memory 136 that communicate with a processor 138. The data processing system 130 may further include a speaker 144, and an I/O data port(s) 146 that also communicate with the processor 138. The I/O data ports 146 can be used to transfer information between the data processing system 130 and another computer system or a network. These components may be conventional components, such as those used in many conventional data processing systems, which may be configured to operate as described herein.

Figure 2:
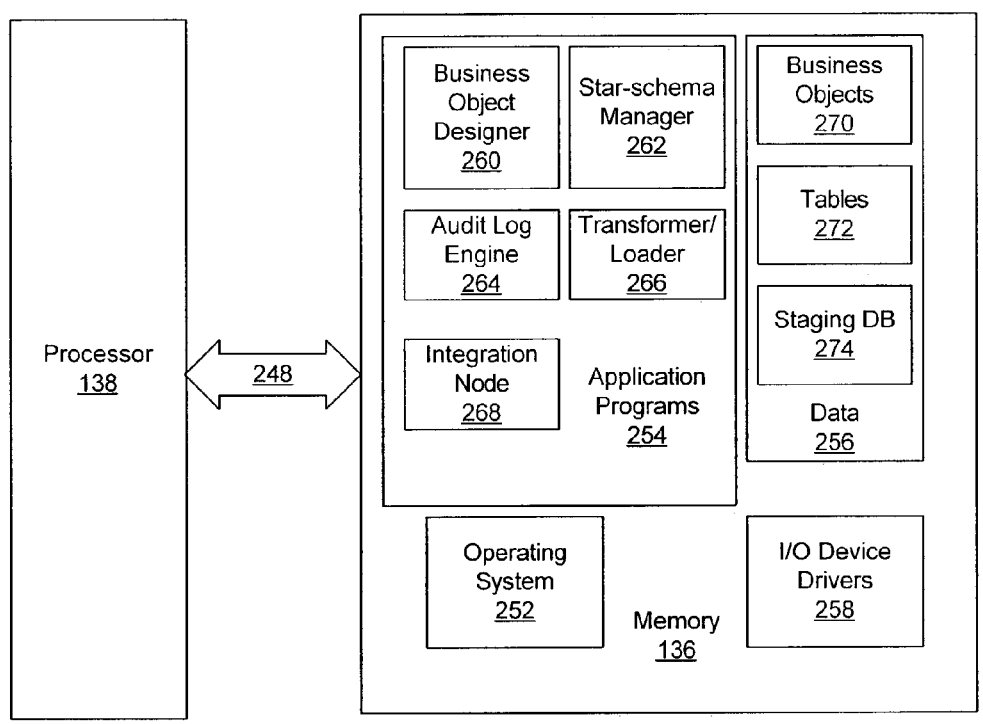
FIG. 2 is a more detailed block diagram of a system according to embodiments of the present invention.

FIG. 2 is a block diagram of data processing systems that illustrates systems, methods, and computer program products in accordance with embodiments of the present invention. The processor 138 communicates with the memory 136 via an address/data bus 248. The processor 138 can be any commercially available or custom microprocessor. The memory 136 is representative of the overall hierarchy of memory devices containing the software and data used to implement the functionality of the data processing system 130. The memory 136 can include, but is not limited to, the following types of devices: cache, ROM, PROM, EPROM, EEPROM, flash memory, SRAM, and DRAM.

As shown in FIG. 2, the memory 136 may include several categories of software and data used in the data processing system 130: the operating system 252; the application programs 254; the input/output (I/O) device drivers 258; and the data 256. As will be appreciated by those of skill in the art, the operating system 252 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wash., Unix or Linux. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features of the data processing system 130 and preferably include at least one application which supports operations according to embodiments of the present invention. Finally, the data 256 represents the static and dynamic data used by the application programs 254, the operating system 252, the I/O device drivers 258, and other software programs that may reside in the memory 136.

As is further seen in FIG. 2, the application programs 254 may include a business object designer module 260, a star-schema manager module 262, an audit log engine module 264, a transformer/loader module 266 and an integration node module 268. The business object designer module 260 may be used to generate extended business objects as described herein. The extended business objects may include information from which the star-schema manager module 262 can generate tables for a data warehouse as described herein. The audit log engine 264 may extract data when an event of a subscribed business object is processed, for example, by the integration node module 268. The integration node module 268 utilizes the business objects defined for an enterprise to control application and/or business process integration. The transformer/loader module 266 may transform the data extracted by the audit log engine 264 and load the transformed data into the tables created by the star-schema module 262 so as to populate the data warehouse with data.

The data portion 256 of memory 136, as shown in the embodiments of FIG. 2, may include business objects 270, tables for defining a data warehouse 272 and/or a staging database 274. The business objects 270 may provide information for generation of the tables 272. The staging database 274 may provide data extracted from the subscribed business objects 270 that is loaded into the tables 272 of the data warehouse.

While the present invention is illustrated, for example, with reference to the business object designer module 260, the star-schema manager module 262, the audit log engine module 264, the transformer/loader module 266 and the integration node module 268 being application programs in FIG. 2, as will be appreciated by those of skill in the art, other configurations may also be utilized while still benefitting from the teachings of the present invention. For example, one or more of the business object designer module 260, the star-schema manager module 262, the audit log engine module 264, the transformer/loader module 266 and/or the integration node module 268 may also be incorporated into the operating system 252 or other such logical division of the data processing system 130. Thus, the present invention should not be construed as limited to the configuration of FIG. 2 but is intended to encompass any configuration capable of carrying out the operations described herein.

Furthermore, while each of the business object designer module 260, the star-schema manager module 262, the audit log engine module 264, the transformer/loader module 266 and the integration node module 268 are illustrated in a single data processing system, as will be appreciated by those of skill in the art, such functionality may be distributed across one or more data processing systems. For example, the functionality of one or more of the business object designer module 260, the star-schema manager module 262, the audit log engine module 264, the transformer/loader module 266 and/or the integration node module 268 may be provided on one or more data processing systems that are separate from the data processing system that provides the functionality of other ones of the business object designer module 260, the star-schema manager module 262, the audit log engine module 264, the transformer/loader module 266 and/or the integration node module 268. Thus, the present invention should not be construed as limited to the configuration illustrated in FIGS. 1 and 2 but may be provided by other arrangements and/or division of function between data processing systems.

Embodiments of the present invention will now be described with reference to FIGS. 3A and 3B which are block diagrams illustrating system for providing self-generating data warehouses according to embodiments of the present invention. The systems in FIGS. 3A and 3B utilize Enterprise Application Integration (EAI) and/or Business Process Integration (BPI), where business objects are defined for an enterprise. The enterprise data model instantiated in the EAI/BPI infrastructure is utilized for creating a self-generating data warehouse solution. EAI/BPI tools define the enterprise data model as a set of standard business objects for the enterprise. These business objects can be used to define the historical data model and then map that model to a star-schema for the data warehouse definition and to the mapping definitions to load the data warehouse.

Figure 3A:
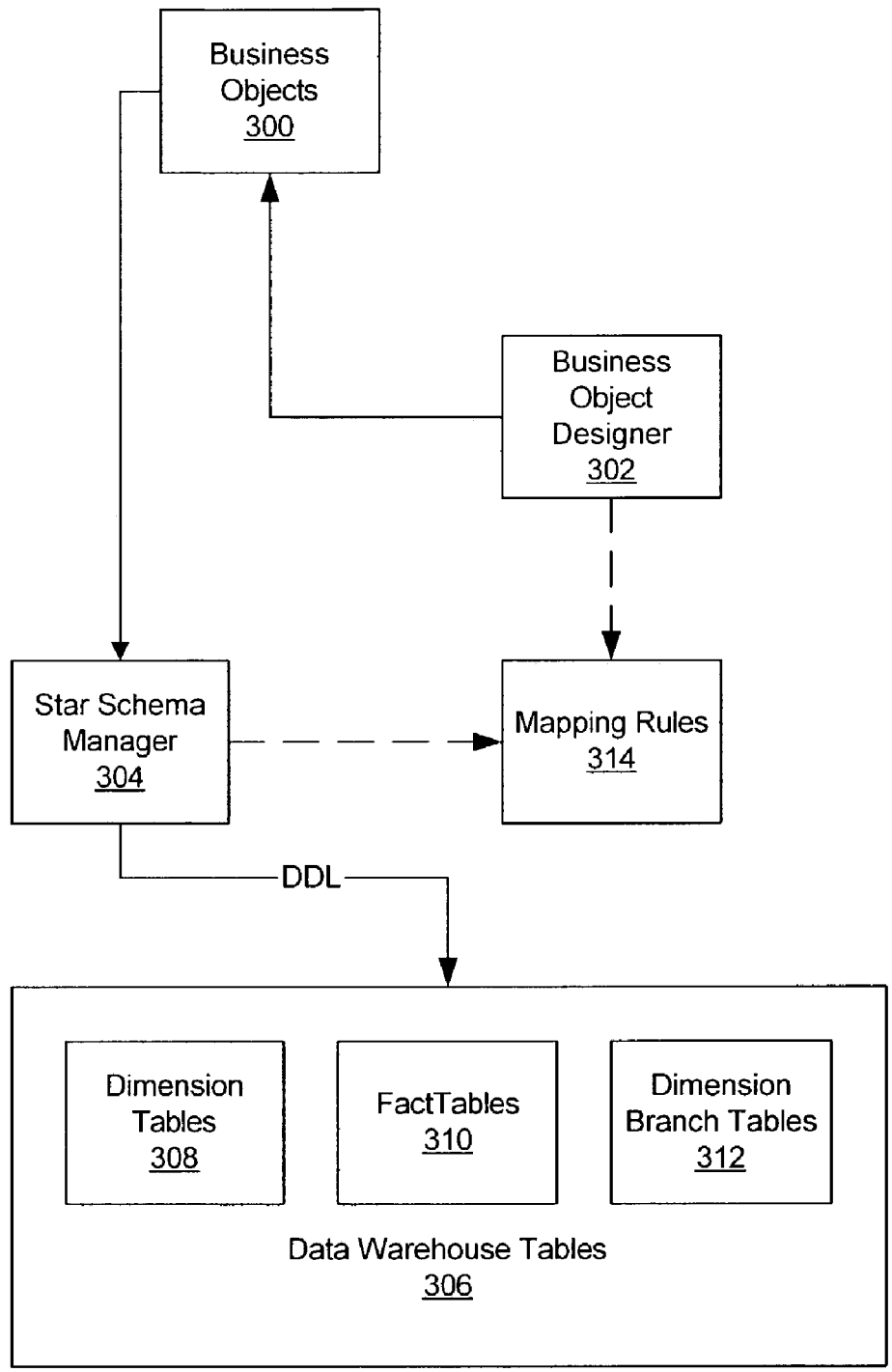
FIGS. 3A and 3B are block diagrams illustrating systems that provide self-generating data warehouses according to embodiments of the present invention.

As seen in FIG. 3A, extended business objects 300 are generated by the business object designer 302. In particular embodiments of the present invention, the business object designer 302 may be WebSphere Business Integration business object designer from International Business Machines Corporation, Armonk, N.Y. Conventional business objects may be modified to extend the conventional business objects to include information from which a data warehouse may be generated. In particular, the graphic user interface provided by WebSphere Business Integration may be modified such that, in addition to the basic fields provided by WebSphere Business Integration, the following fields are added:

Log: indicates whether this attribute will be logged if an event of this business object is processed;

Primary key: indicates whether this attribute will work as the primary key in the dimension table;

Foreign key: indicates the relationship between this business object and other business objects;

As Fact Table's Foreign key: indicates whether this field will work as the foreign key for a specific attribute in the fact table, it is the indicator of how to generate the definition of fact table;

As Fact Table Measure: indicates whether the attributes should show up as the measure in the fact table.

Table 1 below is an example of these fields for an "Order" business object.

TABLE 1

Example Fields of Extended Business Object

| Order BO | Log | P Key | Foreign Key | As Fact Table's Foreign Key | As Fact Table's Measure |
|---|---|---|---|---|---|
| Sales | Yes | | | | Yes |
| Order ID | Yes | Yes | | | |
| OrderDate | Yes | | | | |
| CustomerID | Yes | | Yes - Customer | | |
| Sales Region | Yes | | | | |
| OrderLine Item | Yes | | Yes - Product | | |

The business object designer 302 may be utilized to create the extended business objects 300 by creation of business objects and/or by modification of existing business objects. Thus, for example, predefined business objects may be provided with the EAI/BPI system and those predefined business objects may be modified to provide the extended business objects 300.

The business object designer 302 may also generate mapping rules 314 that map the data from the extended business objects 300 to data to populate tables of a data warehouse.

As is further illustrated in FIG. 3A, the star-schema manager utilizes the information from the extended business objects 300 to generate data definition language (DDL) that generates the data warehouse tables 306. In particular, the dimension tables 308, the fact tables 310 and the dimension branch tables 312 may be generated from the DDL generated by the star-schema manager 304. The tables 306 of the data warehouse may include dimension, fact and/or dimension branching tables that are predefined as well as those that are generated from the extended business objects 300. Thus, for example, marketing, time and other standardized dimensions may be provided by predefined dimension tables. Such predefined tables may be selected by a user so as to be selectively incorporated in a self-generated data warehouse. Also, predefined tables may be selectively modified by the extended business objects so as to add/delete fields (columns), members or the like so as to provide customized tables that define the data warehouse.

Mapping rules 314 are also generated by the star-schema manager 304 as part of the data warehouse generation. Alternatively, the business object designer 302 or other such module, may generate mapping rules 314 that map the data from the extended business objects 300 to data to populate tables of a data warehouse. For example, the mapping rules 314 may be created utilizing EAI/BPIMap designer that may be provided as part of an EAI/BPI system, such as those discussed above from International Business Machines Corporation. Such a mapping may take advantage of the nature of the created business objects to map data from the extended business objects to dimension and/or fact tables.

For example, business objects may, in general, be classified as one of two types: those that are transactional in nature; and those that serve as vehicles for information exchange. Classification of business objects may provide for sorting the full body of business objects into those that are informational and those that are transactional. The informational business objects define the dimension member candidates for the star schema. The transaction business objects define the fact table entry candidates.

Thus, the decomposition of business objects allows the user to define the associations that will generate the star schema DDL from the business objects and also defines the mapping to transform the audit log data into the appropriate data warehouse entries. Output of the classification and mapping process may populate a mapping table that transforms business objects into table updates (either for the dimension tables or for the fact tables).

Figure 3B:
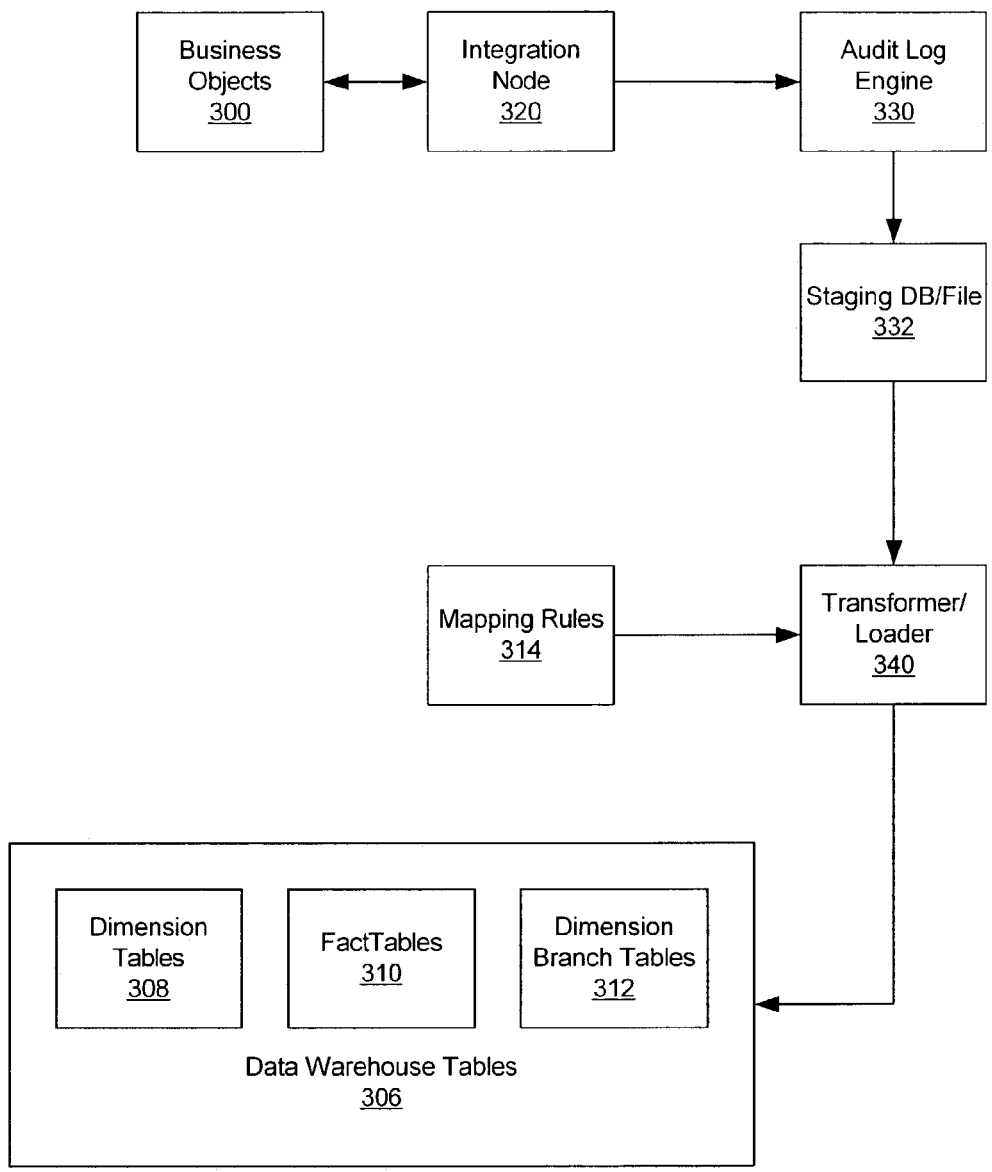

As is further illustrated in FIG. 3B, an integration node 320, which may be a conventional business process manager such as those provided in EAI/BPI systems from International Business Machines Corporation, Armonk, N.Y., utilizes the extended business objects 300 in a conventional manner. However, when the integration node 320 processes an event of an extended business object 300, referred to herein as a subscribing or subscribed business object, the audit log engine 330 extracts data from the subscribing business object and stores this data in a staging database and/or flat file 332. An event that may result in the extraction of data may include, for example, instantiation of a business object or other such activity indicating EAI/BPI collaboration.

The data in the staging database and/or flat file 332 is used by the transformer/loader 340 which utilizes the mapping rules 314 to map the data from the subscribing business objects to the tables 308, 310, 312 of the data warehouse 306 and to load that data into the tables 308, 310, 312.

Figure 4:
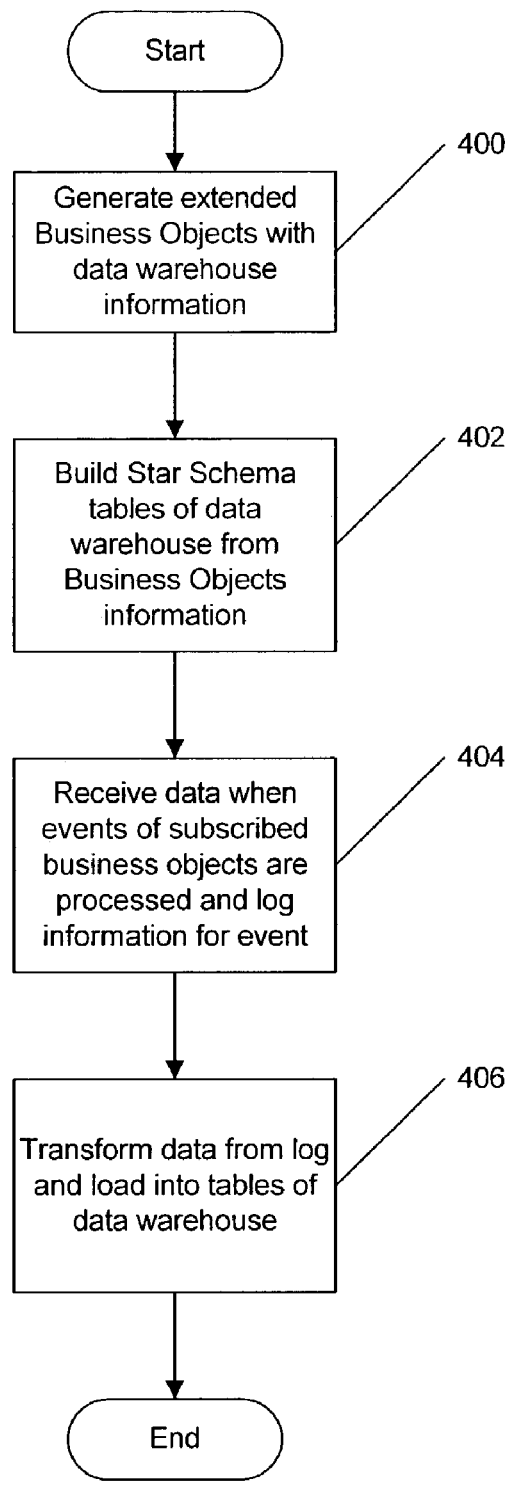
FIG. 4 is flowchart illustrating operations according to embodiments of the present invention.

Operations for generating a data warehouse from business objects according to certain embodiments of the present invention are illustrated in FIG. 4. As seen in FIG. 4, extended business objects that include information associated with the data warehouse are generated (block 400), for example, by use of the business object designer 302. Star-schema tables of a data warehouse are built from the business objects that include the data warehouse information (block 402), for example, by the star-schema manager 304. Data from subscribing business objects is received and stored in a log when an event of a subscribing business object is processed (block 404), for example, by the audit log engine 330. The data from the log is transformed and loaded in the tables of the data warehouse (block 406), for example, by the transformer/loader 340.

Figure 5:
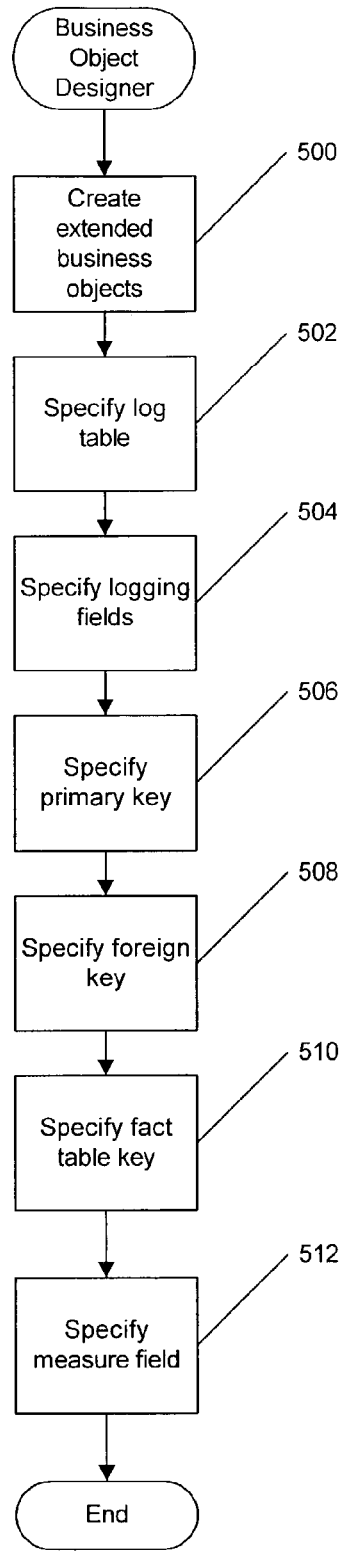
FIG. 5 is a flowchart illustrating operations for generating extended business objects according to embodiments of the present invention.

FIG. 5 illustrates operations of a business object designer, such as the business object designer 302, according to embodiments of the present invention. As seen in FIG. 5, extended business objects are created (block 500), a log table is specified for the extended business objects (block 502) and logging fields are also specified for the extended business objects (block 504). The log table may be used to store the data extracted from the business object and the logging fields may specify which fields of the business object have data logged.

As is further illustrated in FIG. 5, a primary key is specified for the business object (block 506) and foreign keys are also specified (block 508). The primary key may be one or more fields of the business object and the foreign key may be one or more fields of the business object. Fact table keys are also specified (block 510) as well as measure fields of the fact table (block 512).

Figure 6:
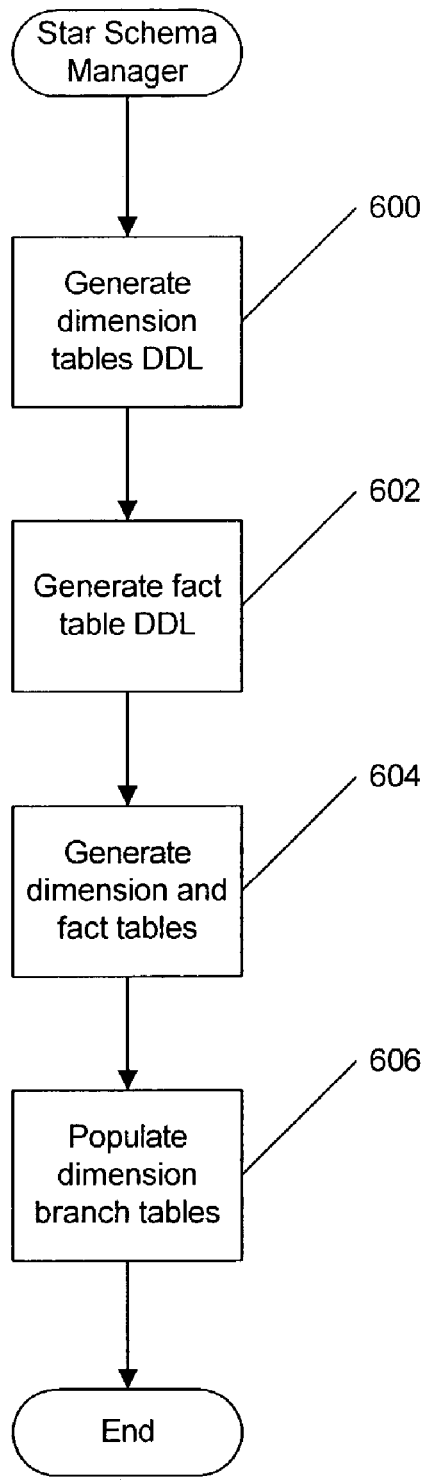
FIG. 6 is a flowchart illustrating operations of a star-schema manager according to embodiments of the present invention.

FIG. 6 illustrates operations of a star-schema manager, such as the star schema manager 304 of FIG. 3A, according to certain embodiments of the present invention. Operations of FIG. 6 may be provided to define tables in a target database to provide a data warehouse. The target database may contain predefined tables that provide basic infrastructure of a data warehouse. The operations of FIG. 6 may be carried out to provide business object specific information in the target database that may further define the star-schema of the target database.

As seen in FIG. 6, dimension tables DDL is generated by the star-schema manager (block 600). As discussed above, dimension tables may be generated based on a categorization of a business object as an informational business object. From the data warehouse information contained in the extended business objects that are informational, the dimension tables of the data warehouse may be specified in DDL. Thus, the DDL of the dimension tables may be generated based on the features specified in the extended business objects. Dimension tables should be generated before fact tables due to dependency issues. Pre-canned (i.e. predefined) dimension tables, such as time and market dimensions, may also be specified in addition to those dimension tables generated from extended business objects.

As is further illustrated in FIG. 6, fact table DDL is also generated by the star-schema manager (block 602). As discussed above, fact tables may be generated based on a categorization of a business object as a transactional business object. From the data warehouse information contained in the extended business objects that are transactional, the fact tables of the data warehouse may be specified in DDL. Thus, fact table DDL may be generated based on the specifications from users. The fact table will contain foreign keys to the dimension tables and, thus, is generated later than dimension tables.

The fact and dimension tables are then generated based on the fact and dimension table DDL (block 604). The generation of the dimension and fact tables may be provided, for example, by connecting to the target database and the star-schema tables created by Java database connectivity (JDBC) connector.

Dimension branch tables of the target database may also be populated (block 606). For example, the dimension branch tables for the pre-canned dimensions, such as time and market dimension tables, may be populated with members. These pre-canned or default dimension members may have standardized features and hierarchies which may be common among many enterprises and, therefore, may be predefined.

Figure 7:
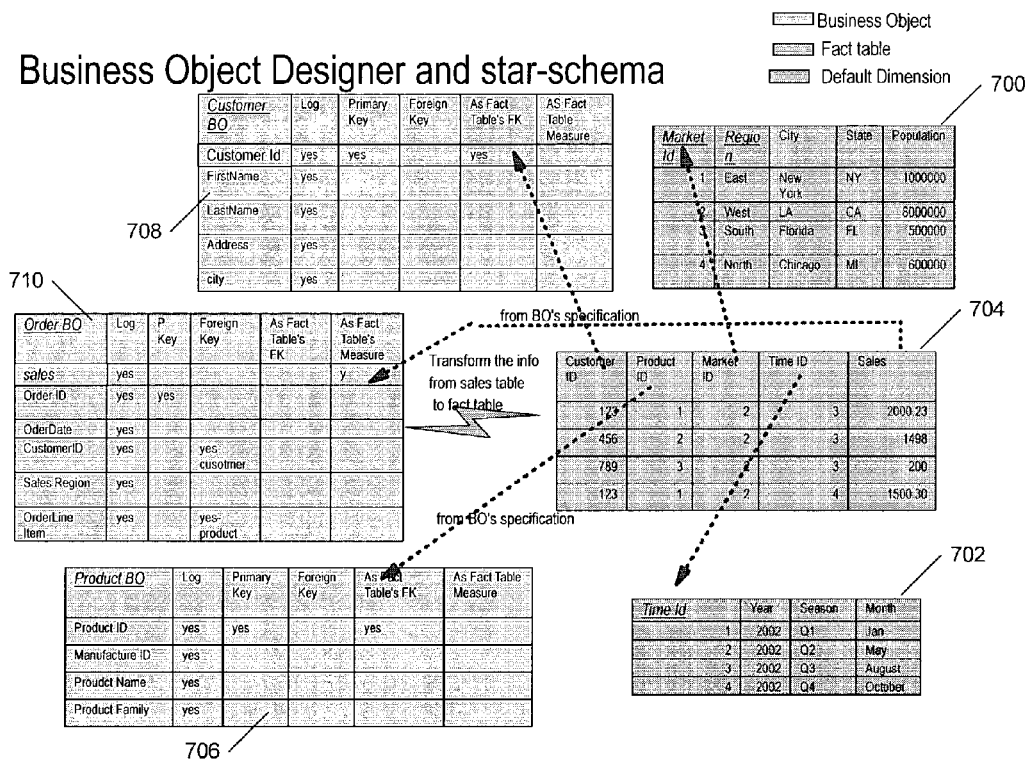
FIG. 7 is a diagram of exemplary extended business objects and corresponding fact and dimension tables according to embodiments of the present invention.

FIG. 7 illustrates example subscribing business objects, default dimension tables and a fact table generated from the subscribing business objects. As seen in FIG. 7, default dimension tables include a Market dimension table 700 and a Time dimension table 702. Also illustrated is a fact table 704, a Product business object 706, a Customer business object 708 and an Order business object 710. The Product business object 706 and the Customer business object 708 are informational business objects and, therefore, a Customer dimension table (not shown) and Product dimension table (not shown) would be generated from the Customer business object 708 and the Product business object 706, respectively. The Order business object 710 is a transactional business object and, therefore, would be incorporated in a fact table.

Referring to the example in FIG. 7, the star-schema manager will generate the DDL's illustrated below. In the present example, the Time and Market dimensions already exist because they contain more standardized data and can be predefined and packaged. The following shows the DDL's generated for Product, Customer dimensions as well as the fact table (Sales).

```
create table PRODUCT(as product dimension)
(
        ProductId            INTEGER not null,
        ManufactureId VARCHAR(80),
        ProductName          VARCHAR(80),
        ProductFamilyId      VARCHAR(80),
        primary key (ProductId)
);
create table CUSTOMER(as customer dimension)
(
        CustomerId     INTEGER not null,
        FirstName      VARCHAR(80),
        LastName       VARCHAR(80),
        Address        VARCHAR(80),
        City           VARCHAR(80),
        primary key (CustomerId)
);
create table Sales(represent the fact table)
(
        CustomerId     INTEGER,
        ProductId      INTEGER,
        MarketId       INTEGER,
        TimeId INTEGER,
        AMOUNT         FLOAT(53),
        CONSTRAINT FK_CustomerId FOREIGN KEY (CustomerId)
                REFERENCES Customer (CustomerId) ON
                DELETE CASCADE,
```

-continued

```
            CONSTRAINT FK_ProductId FOREIGN KEY (ProductId)
                REFERENCES Product (ProductId) ON
                DELETE CASCADE,
            CONSTRAINT FK_MarketId FOREIGN KEY (MarketId)
                REFERENCES Market (MarketId) ON
                DELETE CASCADE,
            CONSTRAINT FK_TimeId FOREIGN KEY (TimeId)
                REFERENCES Time (TimeId) ON
                DELETE CASCADE
);
```

Thus, as seen in FIG. 7, the fact table 704 includes as foreign keys the CustomerId from the Customer business object 708, the ProductId from the Product business object 706, the MarketId from the Market dimension table 700 and the TimeId from the Time dimension table 702. The fact table 704 also includes the sales field from the Order business object 710 as the measure of the fact table 704.

Furthermore, as discussed above, with some dimension tables, the star-schema manager automatically populates the dimension branch. For example, as is further illustrated in FIG. 7, the market dimension can have a predetermined region branch dimension and state branch dimension. Similarly, the time dimension may be populated with hierarchical information, such as quarter, month, or weeks, etc.

Figure 8:
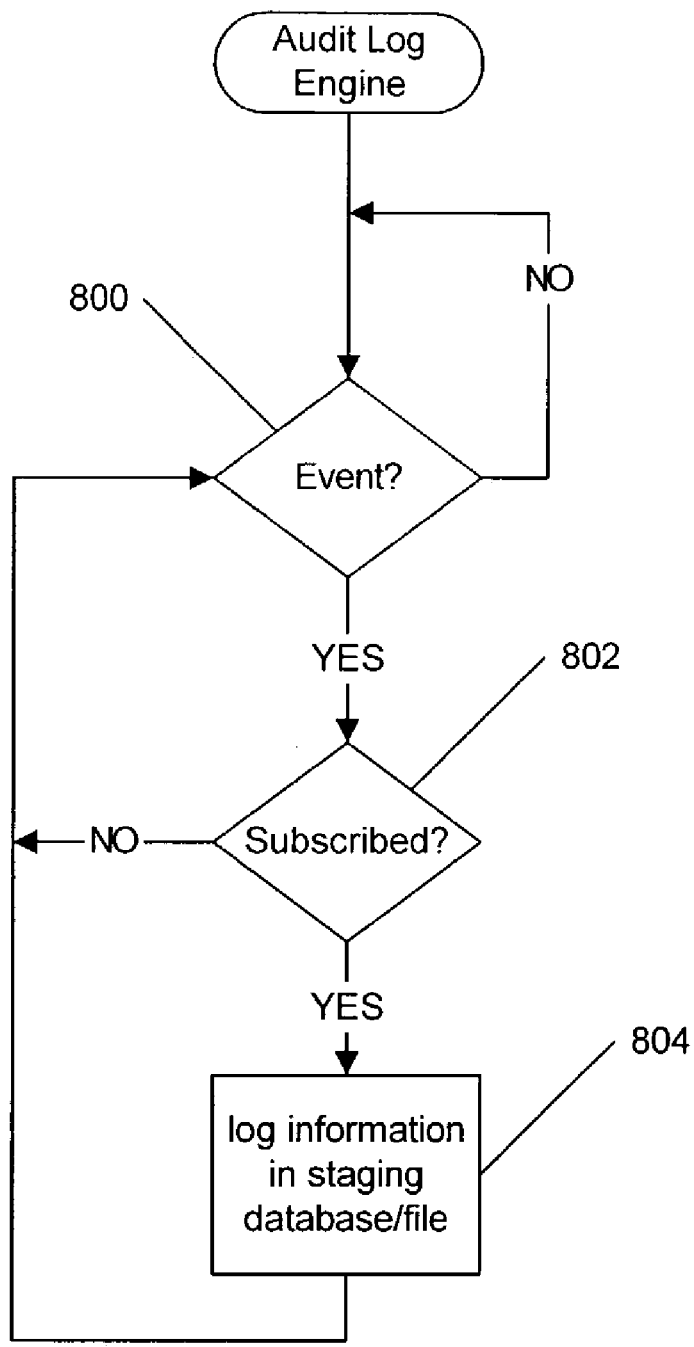
FIG. 8 is a flowchart illustrating operations of an audit log engine according to embodiments of the present invention.

FIG. 8 is a flowchart illustrating operations of an audit log engine, for example, the audit log engine 330 of FIG. 3B, according to certain embodiments of the present invention. As seen in FIG. 8, the audit log engine waits for a the integration node to process an event of a business object (block 800). When an event occurs (block 800), if the event is from a subscribed business object (block 802), the audit log engine logs the information specified as log fields in the business object in a staging database and/or flat file (block 804). The audit log engine then waits for the next event (block 800). If the event is not from a subscribed business object (block 802), the audit log engine waits for the next event (block 800). Thus, when the integration node processes the events of the subscribed business objects, the audit log engine automatically logs the specified business object information in either a staging database (such as an operational data store (ODS)) or in a flat file.

Figure 9:
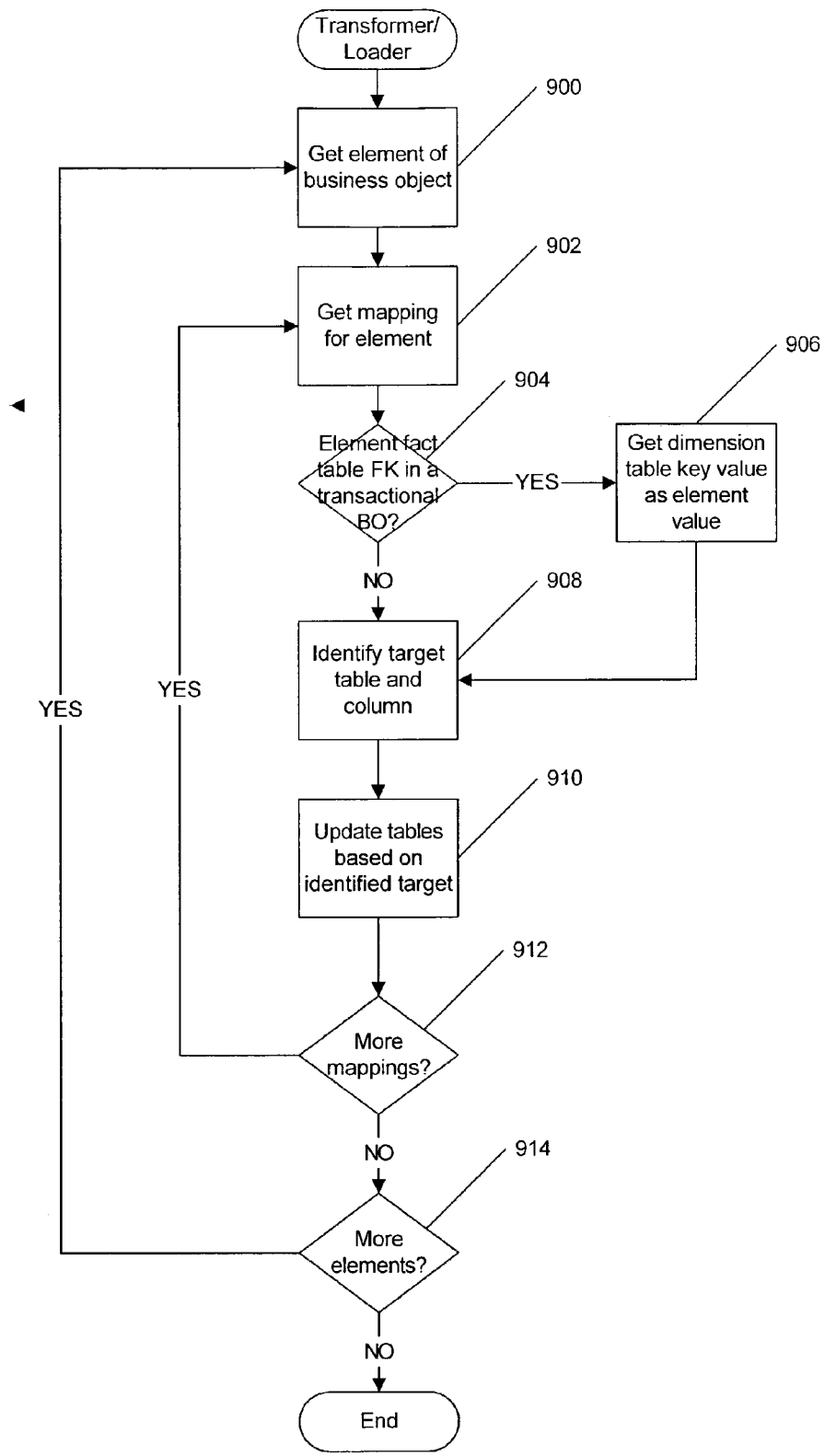
FIG. 9 is a flowchart illustrating operations of a transformer/loader according to further embodiments of the present invention.

FIG. 9 is a flowchart illustrating operations of a transformer/loader, for example, the transformer/loader 340 of FIG. 3B, according to certain embodiments of the present invention. As seen in FIG. 9, the transformer/loader obtains an element of the subscribed business object (block 900) and mapping rules for the element (block 902). In particular embodiments of the present invention, elements of a subscribed business objects are those fields or variables a business object that are indicated as being logged (see e.g. FIG. 7). If the element is a foreign key of a fact table (block 904), the dimension table key value for the foreign key is obtained based on the value of the element and the dimension table key value is used as the value of the element (block 906). The target table and column for the mapping of the element is also determined (block 908) and the target updated with either the element value or the dimension table key value (block 910). If there are more mappings for the element (block 912), then operations continue from block 902 with the next mapping being obtained. If there are no more mappings for the current element (block 912), it is determined if there are more elements of the subscribed business object (block 914). If there are more elements (block 914), then operations continue from block 900 by obtaining the next element of the subscribed business object. If there are no more elements (block 914), then updating of the tables of the data warehouse are completed for the subscribed business object.

As discussed above, embodiments of the present invention may simplify the creation of data warehouse star-schema and may accelerate the building of a data warehouse by leveraging business objects in EAI/BPI systems because business objects encapsulate transaction related information and business objects also have interrelationship with other business objects. Business objects may be used as building blocks for data warehouse modeling and the star-schema manager may create DDL's for a star-schema definition based on a user's specification of the business objects. An audit log engine may capture the specified information that pertains to the data warehouse from the business objects and store it either in a flat file or a staging database. A map designer may be used to automate the process of populating data into the data warehouse.

The flowcharts and block diagrams of FIGS. 1 through 9 illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of providing a self-generating data warehouse, comprising:

generating extended business objects that are utilized in a data warehouse wherein:
 each extended business object stores corresponding business data and also stores data warehouse information; and
 the data warehouse information of each extended business object includes information that specifies the attributes thereof that contain business data to be logged into data warehouse tables and information from which data warehouse tables are generated;

automatically generating descriptions of star-schema tables of the data warehouse based at least in part upon the data warehouse information incorporated into the extended business objects;

generating star-schema tables of the data warehouse based at least in part upon the automatically generated descriptions of star-schema tables, wherein the generated star-schema tables of the data warehouse are stored separately from the extended business objects;

generating mapping rules for mapping business data contained in the specified attributes of associated extended business objects to corresponding star-schema tables of the data warehouse;

extracting business data from the extended business objects and storing the extracted business data to an audit log when an event of the extended business objects is processed based upon the generated mapping rules; and incorporating the extracted business data from the audit log into the corresponding star-schema tables of the data warehouse according the generated mapping rules.

2. The method of claim 1, wherein generating extended business objects that are utilized in a data processing system wherein each extended business object stores data warehouse information and the data warehouse information of each extended business object includes information from which data warehouse tables are generated, comprises.

incorporating as part of said data warehouse information, at least one of:

primary key information that indicates whether an attribute of a corresponding extended business object will work as a primary key in a dimension table;

foreign key information that indicates the relationship between a corresponding extended business object and other extended business objects;

fact table foreign key information that indicates how to generate the definition of a fact table; and/or fact table measure information that indicates whether an attribute of a corresponding extended business object should be a measure of a fact table.

3. The method of claim 1, wherein generating star-schema tables comprises:

generating a dimension table from data warehouse information of at least one extended business object; and generating a fact table from data warehouse information of at least one extended business object.

4. The method of claim 3, wherein generating a dimension table and generating a fact table comprise:

generating a data definition language (DDL) description of the dimension table from the data warehouse information of at least one extended business object; then generating a DDL description of the fact table from the data warehouse information of at least one extended business object; and then executing the DDL descriptions of the dimension table and the fact table to generate the dimension table and the fact table.

5. The method of claim 3, wherein generating star-schema tables further comprises generating a predefined dimension table in addition to the dimension table generated from the data warehouse information contained in at least one extended business object.

6. The method of claim 5, wherein generating star-schema tables further comprises populating a dimension branch table associated with the predefined dimension table.

7. The method of claim 1, wherein generating star-schema tables comprises:

categorizing extended business objects as one of either transactional business objects or informational business objects;

generating a dimension table from data warehouse information of an extended business object categorized as an informational business object; and generating a fact table from data warehouse information of an extended business object categorized as a transaction business object.

8. The method of claim 1, wherein extracting data from extended business objects comprises:

determining if an integration node event associated with a selected extended business object has occurred; and extracting business data from the selected extended business object if the integration node event associated with the selected extended business object has occurred.

9. The method of claim 8, wherein extracting business data from extended business objects and storing the extracted business data to an audit log further comprises implementing the audit log as a staging database and/or a flat file.

10. The method of claim 9, further comprising:

transforming the data in the staging database and/or flat file based on the mapping rules; and loading the transformed data into the star-schema tables of the data warehouse.

11. A computer program product for providing a system for self-generating a data warehouse, comprising:

a computer readable medium having computer readable program code embodied therein, the computer readable program code comprising:

computer readable program code configured to implement a business object designer that generates extended business objects that are utilized in a data warehouse wherein:

the business object designer configures each extended business object to store corresponding business data and also store data warehouse information; and the data warehouse information of each extended business object includes information that specifies the attributes thereof that contain business data to be logged into data warehouse tables and information from which data warehouse tables are generated;

automatically generate descriptions of star-schema tables of the data warehouse based at least in part upon the in the data warehouse information incorporated into the extended business objects;

computer readable program code configured to implement a star-schema manager that automatically generates descriptions of star-schema tables of the data warehouse based at least in part upon the data warehouse information incorporated into the extended business objects and generates star-schema tables of the data warehouse from automatically generated descriptions of star-schema tables of the data warehouse, wherein the generated star-schema tables of the data warehouse are stored separately from the extended business objects;

computer readable program code configured to generate mapping rules for mapping business data contained in the specified attributes of associated extended business objects to corresponding star-schema tables of the data warehouse;

computer readable program code configured to implement an audit log engine that extracts business data from the extended business objects and stores the extracted business data to in an audit log when an event of the extended business objects is processed based upon the generated mapping rules; and computer readable program code configured to implement a transformer/loader that loads the extracted business data stored in the audit log into the data warehouse by populating the star-schema tables of the data warehouse with the extracted business data stored in the audit log according to the generated mapping rules.

12. The computer program product of claim 11, wherein the information from which data warehouse tables are generated, which is included in the data warehouse information of each extended business further comprises at least one of:
   primary key information that indicates whether an attribute of a corresponding extended business object will work as a primary key in a dimension table;
   foreign key information that indicates the relationship between a corresponding extended business object and other extended business objects;
   fact table foreign key information that indicates how to generate the definition of a fact table; and/or
   fact table measure information that indicates whether an attribute of a corresponding extended business object should be a measure of a fact table.

13. The computer program product of claim 11, wherein the computer readable program code configured to implement the star-schema manager is further configured to generate a dimension table from data warehouse information of at least one extended business object and to generate a fact table from data warehouse information of at least one extended business object.

14. The computer program product of claim 13, wherein the computer readable program code configured to implement the star-schema manager is further configured to generate a data definition language (DDL) description of the dimension table from the data warehouse information of at least one extended business object, then generate a DDL description of the fact table from the data warehouse information of at least one subscribed extended business object and then execute the DDL descriptions to generate the dimension table and the fact table.

15. The computer program product of claim 13, wherein the computer readable program code configured to implement the star-schema manager is further configured to generate a predefined dimension table in addition to the dimension table generated from the data warehouse information contained in at least one extended business object.

16. The computer program product of claim 15, wherein the computer readable program code configured to implement the star-schema manager is further configured to populate a dimension branch table associated with the predefined dimension table.

17. The computer program product of claim 11, further comprising computer readable program code configured to categorize extended business objects as one of either transactional business objects or informational business objects; and
   wherein the computer readable program code configured to implement the star-schema manager is further configured generate a dimension table from data warehouse information of at least one extended business object categorized as an informational business object and to generate a fact table from data warehouse information of at least one extended business object categorized as a transactional business object.

18. The computer program product of claim 11, wherein the computer readable program code configured to implement the audit log engine is further configured to determine if an integration node event associated with a selected extended business object has occurred and to extract business data from the selected extended business object if the integration node event associated with the selected extended business object has occurred.

19. The computer program product of claim 18, wherein the computer readable program code configured to implement the audit log engine is further configured to implement the audit log as store the extracted data in a staging database and/or a flat file.

20. The computer program product of claim 19, further comprising computer readable program code configured to implement a transformer/loader is configured to transform the data in the staging database and/or the flat file based on the mapping rules and to load the transformed data into the star-schema tables of the data warehouse.

\* \* \* \* \*